United States Patent [19]

Ban

[11] Patent Number: 5,041,914
[45] Date of Patent: Aug. 20, 1991

[54] IMAGE EXPOSURE APPARATUS USING CRT AS EXPOSURE LIGHT SOURCE

[75] Inventor: Yoshiyuki Ban, Chita, Japan

[73] Assignee: Brother Kogyo Kabushiki Kaisha, Aichi, Japan

[21] Appl. No.: 506,090

[22] Filed: Apr. 9, 1990

[30] Foreign Application Priority Data

Apr. 10, 1989 [JP] Japan ............................... 1-87972

[51] Int. Cl.$^5$ ..................... G01D 15/14; H04N 1/23; H04N 1/46; B41J 2/435
[52] U.S. Cl. ............................ 358/302; 346/110 R; 358/75
[58] Field of Search ............... 346/110 R, 107 R, 108; 358/302, 75; 355/27, 32

[56] References Cited

U.S. PATENT DOCUMENTS 4,185,198  1/1980  Fujimoto .......................... 358/111
4,305,098 12/1981  Mitchell .

FOREIGN PATENT DOCUMENTS 1360501  7/1974  United Kingdom .
87/01892  3/1987  World Int. Prop. O. .

Primary Examiner—Benjamin R. Fuller
Assistant Examiner—Scott A. Rogers
Attorney, Agent, or Firm—Oliff & Berridge

[57] ABSTRACT

An image exposure apparatus exposes a photosensitive recording medium to an image corresponding to an image displayed on the screen of a cathode-ray tube which is used as a light source. A video image detector substantially detects whether there is a video image supplied to the cathode-ray tube or not. A microprocessor starts an exposure in response to an exposure command given by an exposure command switch only when it is detected by the video image detector that there is a video signal.

15 Claims, 2 Drawing Sheets even when the exposure command is given by the exposure command means. As a result, when a connector for applying the video signal to the cathode-ray tube is not connected due to an oversight or the connector suffers a contact failure, no video signal is detected, and hence no exposure is started even if an exposure command is given by the exposure command means.

IMAGE EXPOSURE APPARATUS USING CRT AS EXPOSURE LIGHT SOURCE

BACKGROUND OF THE INVENTION

The present invention relates to an image exposure apparatus for exposing a photosensitive recording medium to an image reproduced by a cathode-ray tube as a light source.

Conventional image exposure apparatus starts processes such as of exposure, development, and fixing in response to the depression of an exposure command switch.

The surface of a photosensitive recording medium is exposed to an image represented by a video image supplied to a cathode-ray tube (hereinafter referred to as a "CRT"). The exposure process is followed by the development and fixing processes.

With the above conventional image exposure apparatus, the exposure process is carried out when the exposure command switch is pushed even if the operator forgets to connect a connector for supplying a video signal to the CRT, or no video signal is applied to the CRT due to a contact failure of the connector. Then, the exposure process is followed by the development and fixing processes. When such an error occurs, the photosensitive recording medium is wasted.

SUMMARY OF THE INVENTION

It is an object of the present invention to provide an image exposure apparatus which will not start image exposure, development, and fixing processes even if an exposure command switch is depressed, when no video signal is supplied to a CRT.

To achieve the above and other objects, according to one aspect of the present invention, there is provided an image exposure apparatus for exposing a photosensitive recording medium to an imaging light, comprising a cathode-ray tube serving as an exposure light source and having a screen on which an image corresponding to an image to be exposed is displayed when a video signal is supplied, video signal detecting means for detecting presence of the video signal supplied to said cathode-ray tube, exposure command means for issuing an exposure command to start an exposure, and exposure starting means for starting the exposure in response to the exposure command issued from said exposure command means only when the presence of the video signal is detected by said video signal detecting means.

According to another aspect of the present invention, there is provided an image recording apparatus for recording an image on an image recording sheet with the use of a photosensitive recording sheet, comprising a cathode-ray tube serving as an exposure light source and having a screen on which an image corresponding to an image to be recorded on the image recording sheet is displayed when a video signal is supplied, the photosensitive recording sheet being exposed to the image displayed on said cathode-ray tube, thereby forming a latent image thereon, video signal detecting means for detecting presence of the video signal supplied to said cathode-ray tube, exposure command means for issuing an exposure command to start an exposure, exposure starting means for starting the exposure in response to the exposure command issued from said exposure command means only when the presence of the video signal is detected by said video signal detecting means, and developing means for developing the latent image and providing a visible image on the image recording sheet.

With the apparatus thus constructed, when then exposure command is given by the exposure command means, an image exposure is started only if it is detected by the video signal detecting means that there is the video signal. Therefore, no exposure is started if no video signal is substantially detected even when the exposure command is given by the exposure command means. As a result, when a connector for applying the video signal to the cathode-ray tube is not connected due to an oversight or the connector suffers a contact failure, no video signal is detected, and hence no exposure is started even if an exposure command is given by the exposure command means.

DETAILED DESCRIPTION OF THE PREFERRED EMBODIMENTS

Figure 1:
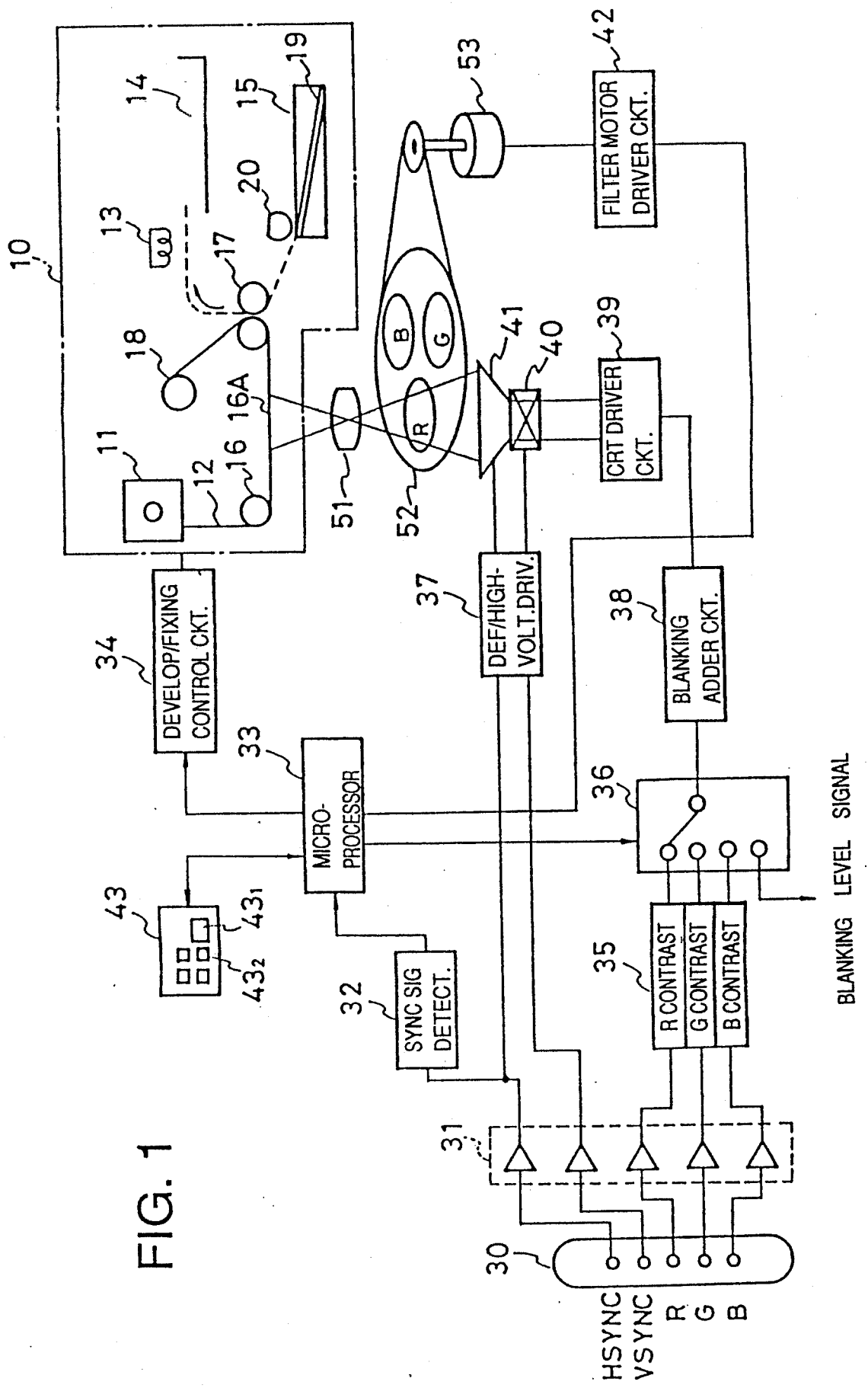
FIG. 1 is a block diagram showing an arrangement of an embodiment of the present invention.

Referring to FIG. 1, a video signal indicative of a red component of an original image, a video signal indicative of a green component thereof, a video signal indicative of a blue component thereof, a horizontal synchronizing signal, and a vertical synchronizing signal are applied through a connector 30 to a buffer amplifier group 31 by which the signals are amplified. The horizontal synchronizing signal issued from the buffer amplifier group 31 is supplied to a synchronizing signal detector circuit 32 which detects whether there is a horizontal synchronizing signal or not.

Figure 2:
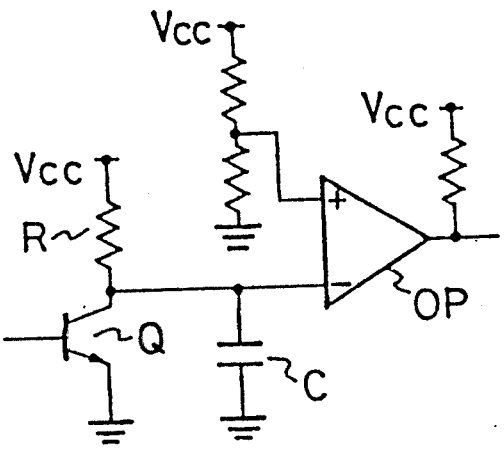
FIG. 2 is a circuit diagram showing a synchronizing signal detector circuit in the embodiment of the invention.

An arrangement of the synchronizing signal detector circuit 32 is shown in FIG. 2. The circuit 32 includes a resistor R whose one terminal is connected to a power supply voltage $V_{cc}$. A capacitor C is connected between the other terminal of the resistor R and ground. A transistor Q has a collector connected to a node connecting the resistor R and the capacitor C, a base serving as an input of the synchronizing signal detector circuit 32, and an emitter connected to ground. A level comparator OP has a non-inverting input to which a reference voltage is applied by the combination of another two resistors connected in series between the power supply voltage $V_{cc}$ and ground. The level comparator OP has an inverting input terminal to which the voltage developed across the capacitor C is applied.

In operation, the capacitor C is charged by the power supply voltage $V_{cc}$ through the resistor R. The transistor Q is connected in parallel to the capacitor C and rendered conductive by the horizontal synchronizing signal applied to the base thereof to provide a discharge path for the capacitor C. The level comparator OP compares the terminal voltage of the capacitor C with the reference voltage produced by dividing the power supply voltage $V_{cc}$. The synchronizing signal detector circuit 32 serves as a retriggerable monostable multivibrator which can be triggered by the horizontal synchronizing signal to produce a pulse whose duration is longer than one period of the horizontal synchronizing signal.

The video signals which represent the red, green, and blue components of the image and which are amplified by the buffer amplifier group 31 are supplied to a contrast correcting circuit 35 which correct the contrasts of these video signals. The video signals which have been corrected in contrast by the contrast correcting circuit 35 are then supplied to a color selector switch 36 which is also supplied with a blanking level signal. One of the supplied video signals and blanking level signal is selected at a time by the color selector switch 36.

The horizontal and vertical synchronizing signals which are amplified by the buffer amplifier group 31 are supplied to a deflection/high-voltage driver 37 which controls currents to be supplied to deflection coils 40 of a CRT 40 in each period of the synchronizing signals for thereby effecting raster scanning.

The video signal and the blanking level signal which have been selected by the color selector switch 36 are supplied through a blanking adder circuit 38 to a CRT driver circuit 39 which drives the CRT 41, so that the CRT 41 is driven by the selected video signal.

A control panel 43 has a keyboard including an exposure command switch $43_1$, and an indicator including an indicator lamp $43_2$ for indicating that the input of a video signal is waited for. An exposure command signal from the control panel 43 and an output signal from the synchronizing signal detector circuit 32 are applied to a microprocessor 33. The synchronizing signal detector circuit 32 applies an output signal indicative of a logic "1" to the microprocessor 33 when the horizontal synchronizing signal is supplied to the synchronizing signal detector circuit 32, and applies an output signal indicative of a logic "0" to the microprocessor 33 when the horizontal synchronizing signal is not supplied to the synchronizing signal detector circuit 32.

A color filter unit 52 and a focusing lens 51 are disposed between the display screen of the CRT 41 and an image exposure region 16A (described later). An image displayed on the display screen of the CRT 41 is focused onto image exposure region 16A through the color filter unit 52 and the focusing lens 51, so that a photosensitive recording sheet 12 in the image exposure region 16A is exposed to the focused image. The color filter unit 52 is actuated by a filter motor 53 to selectively place red (R), green (G), and blue (B) filters in the light path.

An image forming unit 10 includes a cassette case 11 in which a roll of the photosensitive recording sheet 12 is stored. The photosensitive recording sheet 12 is reeled out of the cassette case 11 by a feed roller 16, and passes through the image exposure region 16A and between pressure rollers 17, and then is wound by a takeup roller 18. Color developer sheets 19 stacked in a color developer sheet tray 15 are taken out, one at a time, from the tray 15 by the rotation of a gibbous roller 20. The color developer sheet 19 which is taken out from the tray 15 passes between the pressure rollers 17 while the color developer surface of the color developer sheet 19 is facing the exposed surface of the photosensitive recording sheet 12. Then, the color developer sheet 19 is fed through a thermal fixing unit 13 into a discharge tray 14. The feed roller 16, the pressure rollers 17, the takeup roller 18, and the gibbous roller 20 are rotated at predetermined times by output signals from a development/fixing control circuit 34.

The microprocessor 33, responsive to an output signal from the exposure command switch $43_1$, of the control panel 43 and an output signal from the synchronizing signal detector circuit 32, controls the flickering of the indicator lamp $43_2$, of the control panel 43, and also controls the filter motor 53 through a filter motor driver circuit 42 to control the selection of the colors of the filter unit 52. The microprocessor 33 also controls the switching operation of the color selector switch 36, and the development/fixing control circuit 34 to control the feeding of the photosensitive recording sheet 12 and the color developer sheet 19.

Figure 3:
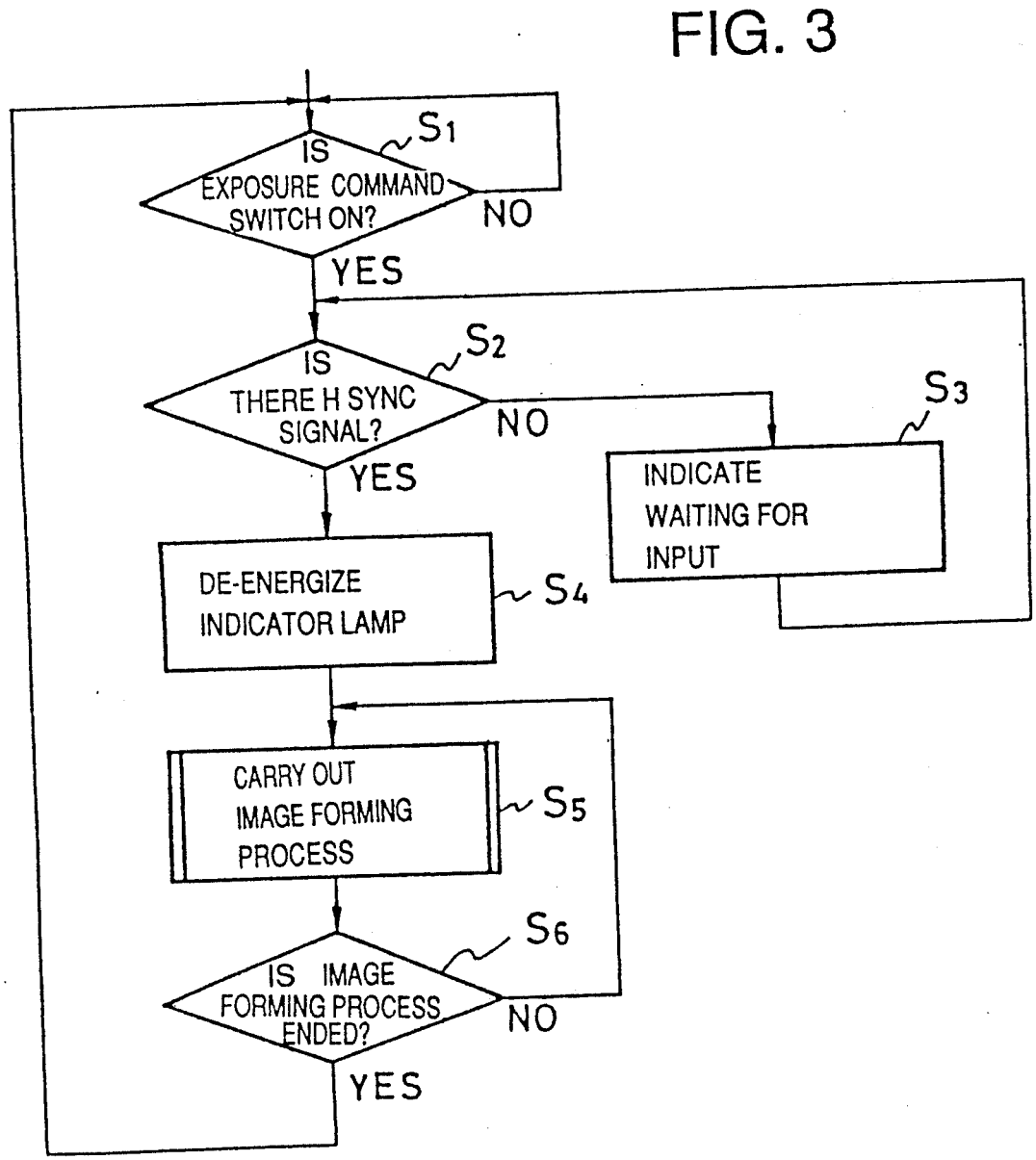
FIG. 3 is a flow chart illustrative of operation of the embodiment of the invention.

Operation of the apparatus thus constructed will be described with reference to the flow chart shown in FIG. 3.

The microprocessor 33 waits for an exposure command signal from the exposure command switch $43_1$ (step S1). When an exposure command signal is issued, the microprocessor 33 determines whether or not there is an output signal from the synchronizing signal detector circuit 32, which indicates a horizontal synchronizing signal (step S2). If no output signal from the synchronizing signal detector circuit 32 is produced in step S2, then the microprocessor 33 turns on the indicator lamp $43_2$ indicating that the application of video signals is waited for, and waits for an output signal indicating the horizontal synchronizing signal (step S3).

If there is an output signal indicating the horizontal synchronizing signal in step S2, then the microprocessor 33 de-energizes the indicator lamp $43_2$ (step S4). Step S4 is followed by an image forming process until a fixing process is finished (steps S5, S6). When the image forming process is over, the microprocessor 33 waits for an exposure command signal from the exposure command switch $43_1$.

The image forming process will now be described below.

When the image forming process is initiated, the microprocessor 33 applies a drive signal to the filter motor driver circuit 42 to energize the filter motor 53 for positioning the red filter (R) of the filter unit 52 between the display screen of the CRT 41 and the focusing lens 51. Then, the microprocessor 33 applies a selection signal to the color selector switch 36 which is shifted thereby from a blanking level signal terminal to a terminal that is supplied with the video signal indicating the red component from the contrast correcting circuit 35. The video signal of the red component is now applied to the CRT driver circuit 39 which energizes the CRT 41 to display a monochromatic image corresponding to the video signal of the red component on the display screen of the CRT 41. During a flyback period, the signal level is lowered by the blanking adder circuit 38 to suppress the emission of light from the display screen.

The image displayed on the display screen of the CRT 41 is focused through the red filter (R) of the filter unit 52 and the focusing lens 51 onto the photosensitive recording sheet 12, which is therefore exposed to the image. The photosensitive recording sheet 12 comprises, for example, a base of paper coated with microcapsules each encapsulating a photocurable resin whose hardness varies depending upon applied light, a photopolymerization initiator, and a chromogenic material, as disclosed in Japanese Laid-Open Patent Publication No. 58(1983)-88739. Only the red component of the image displayed on the display screen of the CRT 41 is extracted by the red filter (R), and applied to the photosensitive recording sheet 12.

Likewise, the filter unit 52 is rotated to select the green filter (G), and the video signal of the green component is selected by the selector switch 36 for exposure. Then, the blue filter (B) is selected, and the video signal of the blue component is selected for exposure. As a result, those microcapsules on the photosensitive recording sheet 12 in the image exposure region 16A which are exposed to light are photocured, and those which are not exposed to light remain unphotocured. Consequently, a color latent image is formed on the surface of the photosensitive recording sheet 12 during the exposure.

Following the formation of the latent image, the microprocessor 33 applies a signal to the development/fixing controller 34. Under the control of the development/fixing controller 34, the takeup roller 18 and the feed roller 16 are driven to feed the photosensitive recording sheet 12. When a start position of the formed latent image reaches a predetermined position just in front of the pressure rollers 17, the gibbous roller 20 is driven to feed a color developer sheet 19 from the color developer sheet tray 15. When the color developer sheet 19 from the tray 15 reaches a predetermined position just in front of the pressure rollers 17, the pressure rollers 17 are brought into abutment against each other. During this time, the feed roller 16, the takeup roller 18, the pressure rollers 17, and the gibbous roller 20 are continuously driven to rotate. The photosensitive recording sheet 12 and the color developer sheet 19 pass between the pressure rollers 17 while the exposed surface of the photosensitive recording sheet 12 and the color-developer-coated surface of the color develop sheet 19 are facing each other. During passage between the pressure rollers 17, those microcapsules which have been photocured are not ruptured. The latent image on the photosensitive recording sheet 12 is developed into a visible image in reaction with the color developer, and the developed image is transferred onto the color developer sheet 19. A colored image is now formed on the color developer sheet 19. The colored image on the color developer sheet 19 is fixed while the color developer sheet 19 is moving through the thermal fixing unit 13. The color developer sheet 19 is thereafter discharged onto the discharge tray 14.

After the photosensitive recording sheet 12 is fed a distance corresponding to one image, the feed roller 16 and the takeup roller 18 are stopped, and the pressure rollers 17 are spaced from each other. The gibbous roller 20 is stopped when one color developer sheet 19 is fed out of the tray 15.

The image forming process is now finished, and the microprocessor 33 waits for an exposure command signal from the exposure command switch 43$_1$.

While video signals are detected by the detection of a horizontal synchronizing signal in the above embodiment, video signals may be detected by the detection of the level thereof which is higher than a predetermined level.

What is claimed is:

1. An image exposure apparatus for exposing a photosensitive recording medium to an imaging light, comprising:
   a cathode-ray tube serving as an exposure light source and having a screen on which an image corresponding to an image to be exposed is displayed when a video signal is supplied;
   video signal detecting means for detecting presence of the video signal supplied to said cathode-ray tube;
   exposure command means for issuing an exposure command to start an exposure; and
   exposure starting means for starting the exposure in response to the exposure command issued from said exposure command means only when the presence of the video signal is detected by said video signal detecting means;
   wherein the video signal is composed of a horizontal synchronizing signal, a vertical synchronizing signal, a red component video signal, a green component video signal, and a blue component video signal, and wherein said video signal detecting means detects presence of the horizontal synchronizing signal.

2. An image exposure apparatus according to claim 1, wherein the video signal has a signal level and wherein the video signal is detected from comparison of the signal level of the video signal with a predetermined value.

3. An image exposure apparatus according to claim 1, wherein said video signal detecting means comprises a retriggerable monostable multivibrator.

4. An image exposure apparatus according to claim 3, wherein said video signal detecting means comprises:
   a power supply voltage;
   a first resistor having a first terminal connected to said power supply voltage and a second terminal;
   a capacitor having a first terminal connected to the second terminal of said first resistor and a second terminal connected to ground;
   a transistor having a collector connected to a node connecting said first resistor and said capacitor, a base applied with the video signal, and an emitter connected to ground;
   a second resistor having a first terminal connected to said power supply voltage and a second terminal;
   a third resistor having a first terminal connected to the second terminal of said second resistor and a second terminal;
   a level comparator having an inverting input connected to the first terminal of said capacitor, a non-inverting input connected to a node connecting said second and third resistors, and an output terminal, said level comparator comparing a voltage across said capacitor with a voltage developed across said third resistor and producing a comparison result on the output terminal.

5. An image exposure apparatus according to claim 1, further comprising a connector through which the video signal is applied.

6. An image exposure apparatus according to claim 5, further comprising indicator means for indicating absence of the video signal when the video signal is not detected by said video signal detecting means.

7. An image recording apparatus for recording an image on an image recording sheet with the use of a photosensitive recording sheet, comprising:
   a cathode-ray tube serving as an exposure light source and having a screen on which an image corresponding to an image to be recorded on the image recording sheet is displayed when a video signal is supplied, the photosensitive recording sheet being exposed to the image displayed on said cathode-ray tube, thereby forming a latent image thereon;
   video signal detecting means for detecting presence of the video signal supplied to said cathode-ray tube;
   exposure command means for issuing an exposure command to start an exposure;

exposure starting means for starting the exposure in response to the exposure command issued from said exposure command means only when the presence of the video signal is detected by said video signal detecting means; and developing means for developing the latent image and providing a visible image on the image recording sheet;

wherein the video signal is composed of a horizontal synchronizing signal, a vertical synchronizing signal, a red component video signal, a green component video signal, and a blue component video signal, and wherein said video signal detecting means detects presence of the horizontal synchronizing signal.

8. An image recording apparatus according to claim 7, wherein the video signal has a signal level and wherein the video signal is detected from comparison of the signal level of the video signal with a predetermined value.

9. An image exposure apparatus according to claim 7, wherein said video signal detecting means comprises a retriggerable monostable multivibrator.

10. An image recording apparatus according to claim 9, wherein said video signal detecting means comprises:

a power supply voltage;

a first resistor having a first terminal connected to said power supply voltage and a second terminal;

a capacitor having a first terminal connected to the second terminal of said first resistor and a second terminal connected to ground;

a transistor having a collector connected to a node connecting said first resistor and said capacitor, a base applied with the video signal, and an emitter connected to ground;

a second resistor having a first terminal connected to said power supply voltage and a second terminal;

a third resistor having a first terminal connected to the second terminal of said second resistor and a second terminal;

a level comparator having an inverting input connected to the first terminal of said capacitor, a non-inverting input connected to a node connecting said second and third resistors, and an output terminal, said level comparator comparing a voltage across said capacitor with a voltage developed across said third resistor and producing an comparison result on the output terminal.

11. An image recording apparatus according to claim 7, further comprising a connector through which the video signal is applied.

12. An image recording apparatus according to claim 11, further comprising indicator means for indicating absence of the video signal when the video signal is not detected by said video signal detecting means.

13. An image recording apparatus according to claim 7, further comprising first conveying means for conveying the photosensitive recording sheet for conveying the photosensitive recording sheet past an exposure region where the photosensitive recording sheet is exposed to the image displayed on the cathode-ray tube, and second conveying means for conveying the image recording sheet to be fed to said developing means, and wherein said first and second conveying means are deactivated when said video signal detecting means detects absence of the video signal.

14. An image recording apparatus according to claim 13, wherein said developing means performs pressure development by applying pressure to the photosensitive recording sheet and the image recording sheet.

15. An image recording apparatus according to claim 14, wherein the photosensitive recording sheet has a surface coated with microcapsules encapsulating a chromogenic material, mechanical strength of the microcapsules being changed when exposed to light, microcapsules of weaker mechanical strength being ruptured when the pressure is applied by said developing means, and wherein the image recording sheet has a surface coated with a developer material which reacts with the chromogenic material released from the ruptured microcapsules.

* * * * *